US008606635B2

(12) United States Patent
Evankovich et al.

(10) Patent No.: US 8,606,635 B2
(45) Date of Patent: Dec. 10, 2013

(54) SYSTEM AND METHOD FOR PRESENTING CONTENT ON A RETAILER'S CONTENT PAGE USING MANUFACTURERS' PRODUCT INFORMATION

(75) Inventors: Carl J. Evankovich, Pittsburgh, PA (US); Kawaljit Gandhi, San Francisco, CA (US); Nitin Mangtani, Los Altos, CA (US); Kamal P. Nigam, Pittsburgh, PA (US); Abdulrahman Salem, Glenshaw, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/271,144

(22) Filed: Oct. 11, 2011

(65) Prior Publication Data
US 2012/0095828 A1 Apr. 19, 2012

Related U.S. Application Data

(60) Provisional application No. 61/393,844, filed on Oct. 15, 2010.

(51) Int. Cl.
*G06Q 30/00* (2012.01)
(52) U.S. Cl.
USPC .................................. 705/14.49; 705/14.73
(58) Field of Classification Search
USPC ..................................................... 705/14.49
See application file for complete search history.

(56) References Cited

U.S. PATENT DOCUMENTS 6,285,987 B1 * 9/2001 Roth et al. ................. 705/14.71
2009/0281923 A1 11/2009 Selinger et al.
2010/0223122 A1 9/2010 Prince, III et al.

FOREIGN PATENT DOCUMENTS

KR 10-2000-0052818 8/2000
KR 10-2005-0109919 11/2005

OTHER PUBLICATIONS

International Search Report and Written Opinion from International Application No. PCT/US2011/055841 mailed Apr. 20, 2012, 11 pages.

* cited by examiner

*Primary Examiner* — John G Weiss
*Assistant Examiner* — Scott C Anderson
(74) *Attorney, Agent, or Firm* — Fish & Richardson P.C.

(57) ABSTRACT

System, methods and computer program products for identifying a featured product based on product information submitted by retailers and manufacturers are described. In some implementations, a retailer and a manufacturer can supply product information to an ad serving system. Based on the product information supplied by the retailer and the manufacturer, a product matching the product can be identified. The matching product can then be presented on a content of the retailer that links to a product page of the matching product.

20 Claims, 10 Drawing Sheets

SYSTEM AND METHOD FOR PRESENTING CONTENT ON A RETAILER'S CONTENT PAGE USING MANUFACTURERS' PRODUCT INFORMATION

CROSS-REFERENCE TO RELATED APPLICATION

This application claims the benefit of priority under 35 U.S.C. §119(e) of U.S. Provisional Application Ser. No. 61/393,844, filed on Oct. 15, 2010. The disclosure of the prior application is considered part of and is incorporated by reference in the disclosure of this application.

TECHNICAL FIELD

The subject matter of this application is generally related to information presentation.

BACKGROUND

The explosive growth of the Internet as a means of electronic consumer-based commerce has made the Internet a suitable medium for targeted distribution of promotional information and products. Consumers are increasingly accessing online resources to conduct purchasing transactions over the World Wide Web. Online advertising and the promotion of goods and services online are among the most popular commercial applications of the Internet, and the Internet has become an extremely significant advertising tool for both the retailers and manufacturers.

Online advertising allows advertisers to measure the effect of online advertising on consumer purchase behavior in personalized advertising. For personalized advertising to be successful, however, a standardized consumer feedback measurement system is often needed to measure the effectiveness of the personalized ads. In the absence of such a system, advertisers often face the complexity and struggle to determine the true value of a sponsored ad campaign.

More recently, consumers browse retailer web sites that include product descriptions of products from many manufacturers. Thus, retailer web sites can actually divert traffic from individual manufacturer web sites. While advertisers may purchase advertisement slots on retailer web pages in which advertisements with embedded links to the advertisers landing pages are shown, many retailers are reluctant to provide the manufacturers with the commercial flexibility or advertising freedom to control the brand products on the retailer web sites, fearing that such autonomy could drive away user traffic as well as potential businesses to other third party web sites. Due to a lack of standard communication protocols between retailers and manufacturers, most product promotions also often fail to obtain desirable results. The lack of communication with the manufacturers forces many retailers to independently develop category presentations and product information for products listed in the retailer's online store, which drives up overhead costs, particularly in view of the need for updating the product listing every time a new product is released to the public.

SUMMARY

System, methods and computer program products for identifying a featured product based on product information submitted by retailers and manufacturers are described. In some implementations, a retailer and a manufacturer can supply product information to an ad serving system. Based on the product information supplied by the retailer and the manufacturer, a product matching the product can be identified. The matching product can then be presented on a content of the retailer that links to a product page of the matching product.

In some implementations, a method can be provided that includes receiving attribute data from a first entity, the attribute data relating to advertisement presentations on a content page of the first entity; receiving campaign information associated with an advertising campaign from a second entity, the campaign information including product information associated with one or more promotional products; identifying, from the one or more promotional products, a matching product based on the attribute data and the product information; and providing, for presentation, an advertisement for the matching product on the content page, the advertisement including a link to a product page, the product page promoting an offering of the matching product by the first entity.

In some implementations, a method can be provided that includes receiving a listing of a plurality of products offered by a first entity; receiving serving criteria associated with the plurality of products; receiving a selection from a second entity, the selection selecting a product from the plurality of products for which targeting is desired; receiving a product request; identifying one or more matching products that match the product request based on the one or more selections and the serving criteria; and presenting, in response to the product request, the one or more matching products as one or more featured products on a content page of the first entity, each featured product configured to point to a product page associated with a corresponding featured product, the product page hosted by the first entity.

In some implementations, a computer-readable medium can be provided that includes instructions stored thereon, which, when executed by a processor, causes the processor to perform operations comprising: receiving attribute data from a first entity, the first attribute data relating to advertisement presentations on a content page of the first entity; receiving campaign information associated with an advertising campaign from a second entity, the campaign information including product information associated with one or more promotional products; identifying, from the one or more promotional products, a matching product based on the attribute data and the product information; and providing, for presentation, the an advertisement for the matching product on the content page, the advertisement including a link to a product page, the product page promoting an offering of the matching product by the first entity.

In some implementations, a method can be provided that includes receiving, from a retailer, a listing of products or product serving parameters associated with the products offered by the retailer; receiving, from a manufacturer, one or more promotional products for which targeting is desired; receiving, from the retailer, a product request in response to a user query, the product request containing a request for a featured product to be placed on a content page hosted by the retailer; identifying, by a content server, a matching product that matches a product in the listing of product or meets the product serving parameters; and providing, by the content server in response to the product request, a presentation of the identified matching product as a featured product on the content page, the featured product presented with one or more non-sponsored products internally retrieved by the retailer based on the user query.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Advertisers, such as manufacturers, provide sponsored pages on a retailer web site to directly control their product related information and personalize brand product presentations displayed on the retailer web sites to increase the effectiveness of personalized advertising.

A featured product identification process allows manufacturers to create ad campaigns based on product information submitted by the retailers, and promote featured products on various retailer web sites that meet the serving criteria set forth by the retailers. For retailers, the featured product identification process allows prime ad space on the retailer web site to be sold to manufacturers willing to pay for the ad space, and to limit the featured products to only those that are also sold or offered by the retailers so that the user traffic can be retained on the retailer web site. The featured product identification process also permits retailers to render and display special featured products as if the special featured products were organic promotions, and which are configured to point to the corresponding retailer product landing page to facilitate immediate product purchase or product review.

As will be discussed in greater detail in FIGS. 3-10, displaying featured products promoted by the manufacturers and selected based on the retailer's serving requirement offers the retailer the ability to, for example, publish quality product advertisements and pages suitable for rendering in various context in a less intrusive manner (e.g., offer search, item page, category page, or main homepage), approve and disapprove certain product creatives to maximize the suitability of the featured products to the products offered by the retailers, and customize the look and feel of the resulting creative to enhance the promotional nature of the featured product(s). Manufacturers can also benefit from the foregoing process through the creation and launching of targeted marketing campaigns for a specific product or groups of products, and to pay for the showing of featured products that have a clear and immediate payoff as the featured products are directly promoted by the retailer (e.g., by showing the featured products on and promoted by retailers such as Walmart®, Target®, and Sears®).

System Overview

Figure 1:
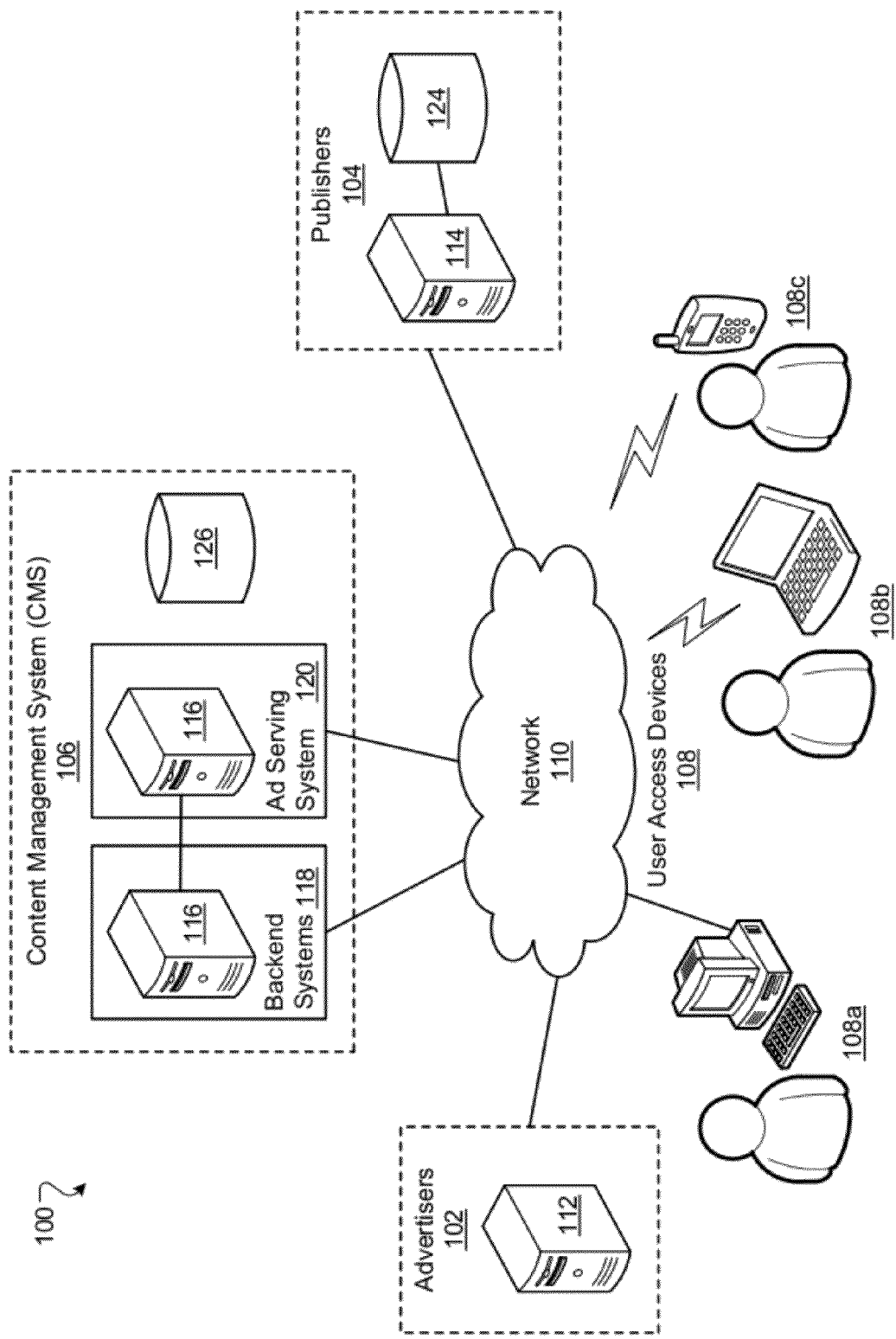
FIG. 1 is a block diagram showing an example content presentation environment.

FIG. 1 is a block diagram showing an example content presentation environment 100. The environment 100 facilitates receiving and providing content to users, publishers, and advertisers. For example, the content can include web documents, links, images, advertisements, and other information. Advertisements from advertisers can be delivered and served to users along with other content (e.g., a publisher web page). In some implementations, a content management system 106 can select and deliver advertiser content that is contextually relevant to and of an appropriate format and style to the publisher content accessed.

In some implementations, content can include one or more advertisements. An advertisement or an "ad" can refer to any form of communication in which one or more products, services, ideas, messages, people, organizations or other items are identified and promoted. Ads need not be limited to commercial promotions or other communications. An ad can be a public service announcement or any other type of notice, such as a public notice published in printed or electronic press or a broadcast. An ad can also be referred to as sponsored content.

In some implementations, ads can be communicated via various mediums and in various forms. For example, ads can be communicated through an interactive medium, such as the Internet, and can include graphical ads (e.g., banner ads), textual ads, image ads, audio ads, video ads, ads combining one of more of any of such components, or any form of electronically delivered advertisement. Ads can include embedded information, such as embedded media, links, meta-information, RSS (Really Simple Syndication) feeds, and/or machine executable instructions.

The term "ad" can refer to either a single "creative" and/or an ad from an "ad group." A creative can be any content that represents one ad impression. An ad impression refers to any form of presentation of an ad such that it is viewable/receivable to a user. In some implementations, an ad impression can occur when displaying an ad on a display device of a user access device. An ad group can be an entity that represents a group of creatives that share a common characteristic, such as having the same ad targeting criteria. Ad groups can be used to create an ad campaign.

In some implementations, ads can be embedded within other content. For example, ads can be displayed with other content in a web page associated with a publisher. When displayed, the ads can occupy an ad space "slot" or "block." Ad space can include any space that allows rendering/presentation of information (i.e., associated with a given ad). In some examples, the ad space can be implemented as a Hyper- Text Markup Language (HTML) element, such as an inline frame (I-Frame) or other type of embeddable display element. The ad space can include any portion, or all, of a user display. The ad space can be a discrete, isolated portion of a display or blended and dispersed throughout a display. The ad space can be a discrete element or dispersed in multiple sub-elements.

In some implementations, ads can be integrated with the surrounding content of the web page they are displayed with, prior to viewing by a user. For example, the rendering of the text of an ad can be in the same or a complementary size, color, and font type as the text on the web page into which it is integrated. In addition, the ad can be displayed using the same color scheme or chrome of the surrounding web page into which it is integrated. Typically, the better integrated into its web page surroundings an ad is, the better the ad will perform in terms of notice and interaction by a user.

In some implementations, the CMS 106 can dynamically determine how to render/present an ad. For example, the CMS 106 can determine how much space a particular ad can occupy. Moreover, the CMS 106 can determine if the ad can be expanded, shrunk, side-barred, bannered, popped up, or otherwise displayed alone or with other ads within a specific publisher's website. For example, the CMS 106 can use ad features (e.g., title, text, links, executable code, images, audio, embedded information, targeting criteria, etc.) to identify if an ad can be served in a particular ad block.

In determining how to render/present an ad, the CMS 106 can determine how to best integrate the ad into its web page surroundings. Prior to rendering the ad, the CMS 106 can determine specific data related to the web page (e.g., types of fonts used, colors, font sizes, color scheme used by the web page, etc.). Using this data, the CMS 106 can select fonts, colors, font sizes, chromes, etc. that can best render the ad in order for it to integrate well into the web page.

A "click-through" of a displayed ad can occur when a user clicks or otherwise selects/interacts with the ad. A "conversion" can occur, for example, when a user consummates a transaction related to a given ad. For example, a conversion can occur when a user clicks on an ad, which refers them to the advertiser's web page, and consummates a purchase on the advertiser's web page before leaving that web page. Other types of conversions can also be used.

As shown in FIG. 1, the CMS 106 can communicate with one or more content providers (e.g., advertisers 102), one or more publishers 104, and one or more user access devices 108 (user access device 108a, user access device 108b, user access device 108c). All of the elements can be coupled to a network 110. Each of the elements 102, 104, 106, 108, and 110 in FIG. 1 can be implemented or associated with hardware components, software components, or firmware components, or any combination of such components. For example, the elements 102, 104, 106, 108, and 110 can be implemented or associated with general purpose servers, software processes and engines, and/or various embedded systems. For example, the elements 102, 104, 106, and 110 can serve as an ad distribution network. While reference is made to distributing advertisements, the system 106 can be suitable for distributing other forms of content including other forms of sponsored content.

The advertisers 102 can include any entities that are associated with ads. The advertisers 102 can provide, or be associated with, products and/or services related to ads. For example, the advertisers 102 can include, or be associated with, retailers, wholesalers, warehouses, manufacturers, distributors, health care providers, educational establishments, financial establishments, technology providers, energy providers, utility providers, or any other product or service providers or distributors.

The advertisers 102 can directly or indirectly generate, maintain, and/or track ads, which can be related to products or services offered by or otherwise associated with the advertisers. The advertisers 102 can include, or maintain, one or more data processing systems 112, such as servers or embedded systems, coupled to the network 110. The advertisers 102 can include or maintain one or more processes that run on one or more data processing systems.

The publishers 104 can include any entities that generate, maintain, provide, present, and/or process content in the CMS 106. The publisher "content" can include various types of content including web-based information, such as articles, discussion threads, reports, analyses, financial statements, music, video, graphics, search results, web page listings, information feeds (e.g., RSS feeds), television broadcasts, radio broadcasts, printed publications, etc. The publishers 104 can include or maintain one or more data processing systems 114, such as servers or embedded systems, coupled to the network 110. The publishers 104 can include or maintain one or more processes that run on data processing systems. In some implementations, the publishers 104 can include one or more content repositories 124 for storing content and other information.

In some implementations, the publishers 104 can include content providers. For example, content providers can include those with an internet presence, such as online publication and news providers (e.g., online newspapers, online magazines, television websites, etc.), or online service providers (e.g., financial service providers, health service providers, retailers, etc,). One or more of the publishers 104 can represent a content network that is associated with the CMS 106.

In some implementations, the publishers 104 can include search services. For example, search services can include those with an internet presence, such as online search services that search the worldwide web, online knowledge database search services (e.g., dictionaries, encyclopedias), etc.

The publishers 104 can provide or present content via various mediums and in various forms, including web based and non-web based mediums and forms. The publishers 104 can generate and/or maintain such content and/or retrieve the content from other network resources.

The CMS 106 can manage content (e.g., ads) and provide various services to the advertisers 102, the publishers 104, and the user access devices 108. The CMS 106 can store ads in a repository 126 and facilitate the distribution or targeting of ads through the CMS 106 to the user access devices 108.

The CMS 106 can include one or more data processing systems 116, such as servers or embedded systems, coupled to the network 110. The CMS 106 can also include one or more processes, such as server processes. In some implementations, the CMS 106 can include an ad serving system 120 and one or more backend processing systems 118. The ad serving system 120 can include one or more data processing systems 116 and can perform functionality associated with delivering ads to publishers or user access devices. The backend processing systems 118 can include one or more data processing systems 116. The backend processing systems 118 can perform functionality associated with identifying relevant ads to deliver, customizing ads, performing filtering processes, generating reports, maintaining accounts and usage information, and other backend system processing. The CMS 106 can use the backend processing systems 118 and the ad serving system 120 to distribute ads from the advertisers 102 through the publishers 104 to the user access devices 108.

In some implementations, the CMS 106 can provide various features to the publishers 104. The CMS 106 can deliver ads (associated with the advertisers 102) to the user access devices 108 when users access content from the publishers 104. For example, the CMS 106 can deliver ads that are relevant to publisher sites, site content, and publisher audiences. In another example, the CMS 106 can allow the publishers 104 to search and select specific products and services as well as associated ads displayed with content provided by the publishers 104. In some implementations, the publishers 104 can search through ads in the ad repository 126 and select certain ads for display with their content.

The user access devices 108 can include devices capable of receiving information from the network 110. The user access devices 108 can include general computing components and/or embedded systems optimized with specific components for performing specific tasks. Examples of user access devices 108 can include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, and other electronic devices. The user access devices 108 can also include various other elements, such as processes running on various machines. In some implementations, the user access devices are not electronic (e.g., printed publications).

The network 110 can include any element or system that facilitates communications among and between various network nodes, such as elements 108, 112, 114, and 116. The network 110 can include one or more telecommunications networks, such as computer networks, telephone or other communications networks, the internet, etc. The network 110 can include a shared, public, or private data network (e.g., an intranet, a peer-to-peer network, a private network, a virtual private network (VPN), etc.) encompassing a wide area (e.g., WAN) or local area (e.g., LAN). In some implementations, the network 110 can facilitate data exchange by way of packet switching using the Internet Protocol (IP). The network 110 can also facilitate wired and/or wireless connectivity and communication.

In some implementations, user access devices 108 and advertisers 102 can provide usage information to the CMS 106 (e.g., whether or not a conversion or click-through related to an ad has occurred). This usage information can include measured or observed user behavior related to served content. For example, the CMS 106 can perform financial transactions, such as crediting publishers 104 and charging advertisers 102 based on the usage information.

A user access device (e.g., user access device 108a) can present in a viewer (e.g., a browser or other content display system) the search results integrated with one or more of the ads provided by the CMS 106. In some implementations, the user access device can transmit information about the ads back to the CMS 106, including information describing how, when, and/or where the ads are to be/were rendered/presented (e.g., in HTML or JavaScript®).

Additional and/or different elements not shown can be contained in or coupled to the elements shown in FIG. 1, and/or certain illustrated elements can be absent. In some examples, the functions provided by the illustrated elements could be performed by less than the illustrated number of components or even by a single element. The illustrated elements could be implemented as individual processes run on separate machines or a single process running on a single machine.

Figure 2:
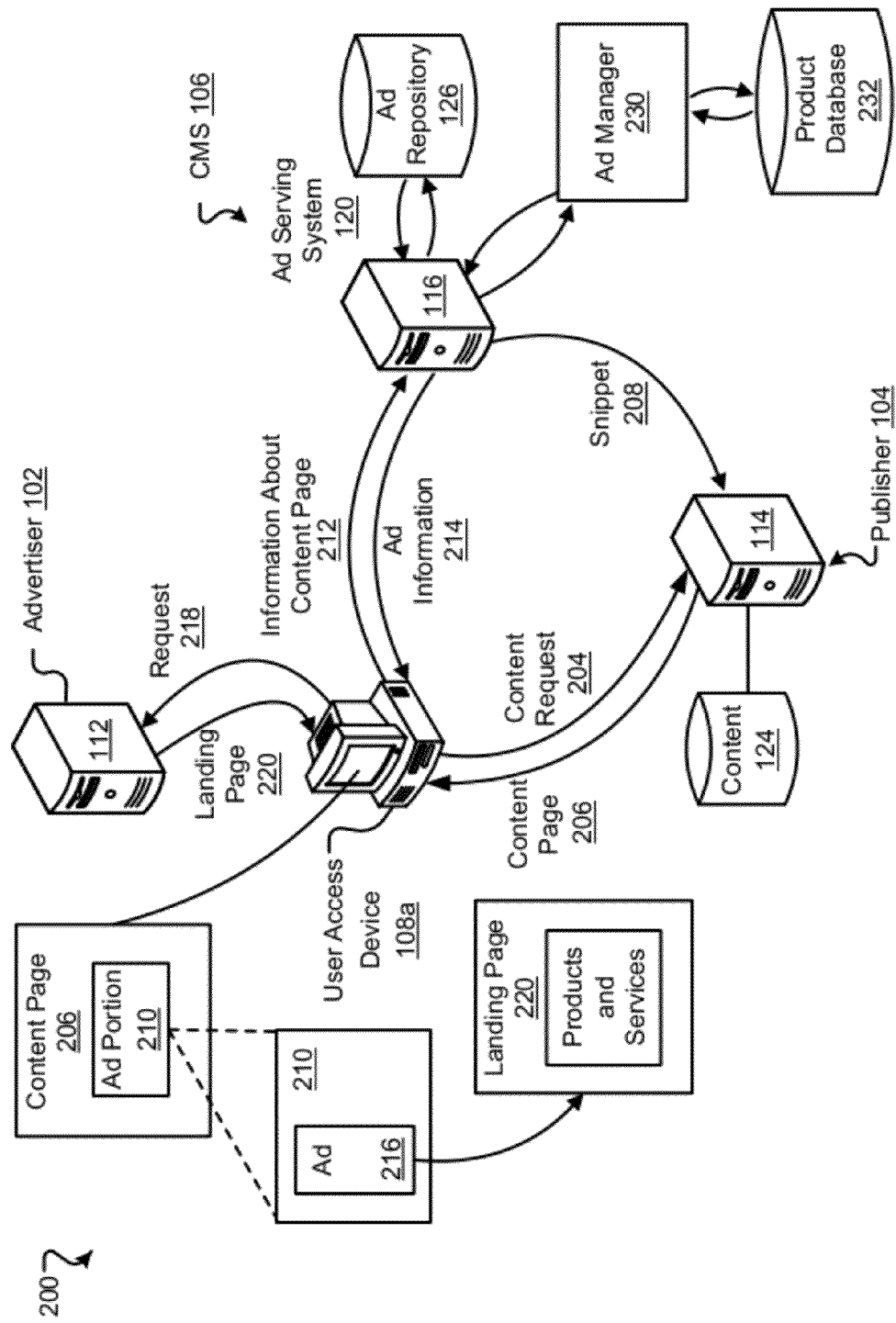
FIG. 2 is a data flow diagram showing an example data flow.

FIG. 2 is a data flow diagram showing an example data flow 200. In particular, the data flow 200 shows ad component interactions when ads are being served (e.g., by the CMS 106). It should be noted that the data flow 200 is merely an example illustration and not intended to be restrictive. Other data flows are possible, and the illustrated events and their particular order in time can vary depending on a specific design and application.

As shown in FIG. 2, a publisher 104a can receive a content request 204 from the user access device 108a. For example, the content request 204 can be a request for a web document on a given topic (e.g., pet food suppliers). In response to the request 204, the publisher can retrieve relevant content (e.g., the web page for Example_Pet_Supply_Retailer) from the content repository 124.

The publisher 104a can respond to the content request 204 by sending a content page 206 or other presentation, representation, or characterization of the content to the requesting user access device 108a. The content page 206 can include the requested content (e.g., the web page for Example_Pet_Supply_Retailer) as well as a code snippet 208 associated with an ad. For example, a code snippet can refer to a method used by one device (e.g., a server) to ask another device (e.g., a browser running on a client device) to perform actions after or while downloading information. In some implementations, a code snippet can be in JavaScript® code or can be part of the HTML or other web page markup language or content.

In some implementations, the CMS 106 can send the code snippet 208 to the publisher 104a and/or the user access device 108a. In some implementations, the code snippet 208 can originate and/or be provided from other sources. As the requesting user access device 108a loads the content page 206, the code snippet 208 causes the user access device 108a to contact the CMS 106 and receive additional code (e.g., Java Script®), which causes the content page 206 to load with an ad portion 210.

The ad portion 210 can be similar to, or include, an ad block. The ad portion 210 can include any element that allows embedding/including of information within the content page 206. In some implementations, the ad portion 210 can be an HTML element (e.g., an I-Frame) or other type of frame.

In some implementations, the ad portion 210 can be hosted by the CMS 106 or the publisher 104a and can allow content (e.g., ads) from the CMS 106 or the publisher 104a to be embedded inside the content page 206. Parameters associated with the ad portion 210 (e.g., its size, shape, and other style characteristics) can be specified in the content page 206 (e.g., in HTML), so that the user access device 108a can present the content page 206 while the ad portion 210 is being loaded.

In general, when a user clicks on or otherwise interacts with the displayed ad 216, an embedded code snippet can direct the user access device 108a to contact the CMS 106. During this event, the user access device 108a can receive an information parcel, such as a signed browser cookie, from the CMS 106. This information parcel can include information, such as an identifier of the selected ad 216, an identifier of the publisher 104a, and the date/time the ad 216 was selected by the user. The information parcel can facilitate processing of conversion activities or other user transactions.

The user access device 108a can then be redirected to the advertiser 102 associated with the selected ad 216. The user access device 108a can send a request 218 to the associated advertiser 102 and then load a landing page 220 from the advertiser 102. The user can then, for example, perform a conversion action at the landing page 220, such as purchasing a product or service, registering, joining a mailing list, etc. The CMS 106 can provide a code snippet, which can be included within a conversion confirmation page script such as a script within a web page presented after the purchase. The user access device 108a can execute the code snippet, which can contact the CMS 106 and report conversion data to the CMS 106. The conversion data can include conversion types and numbers as well as information from cookies. The conversion data can be maintained in a conversion data repository.

Product Targeting

Figure 3:
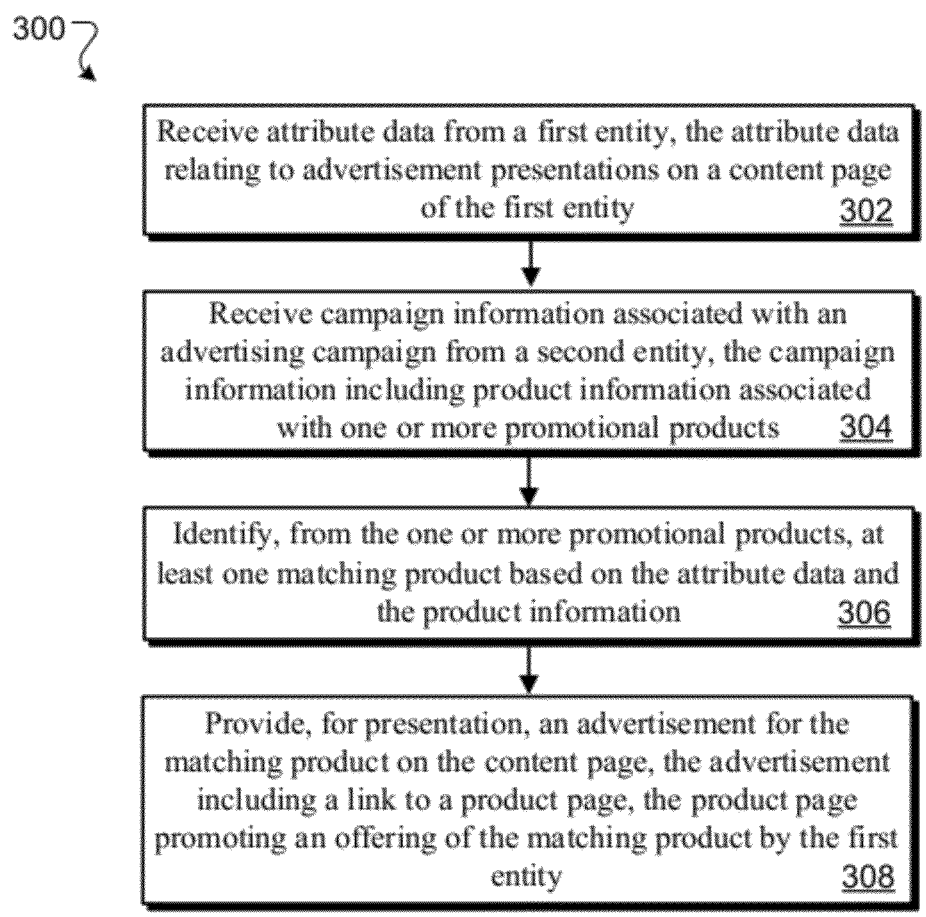
FIG. 3 is an example of a process for facilitating the identification and presentation of featured products based on product information supplied by advertisers such as manufacturers and publishers such as retailers.
Figure 4:
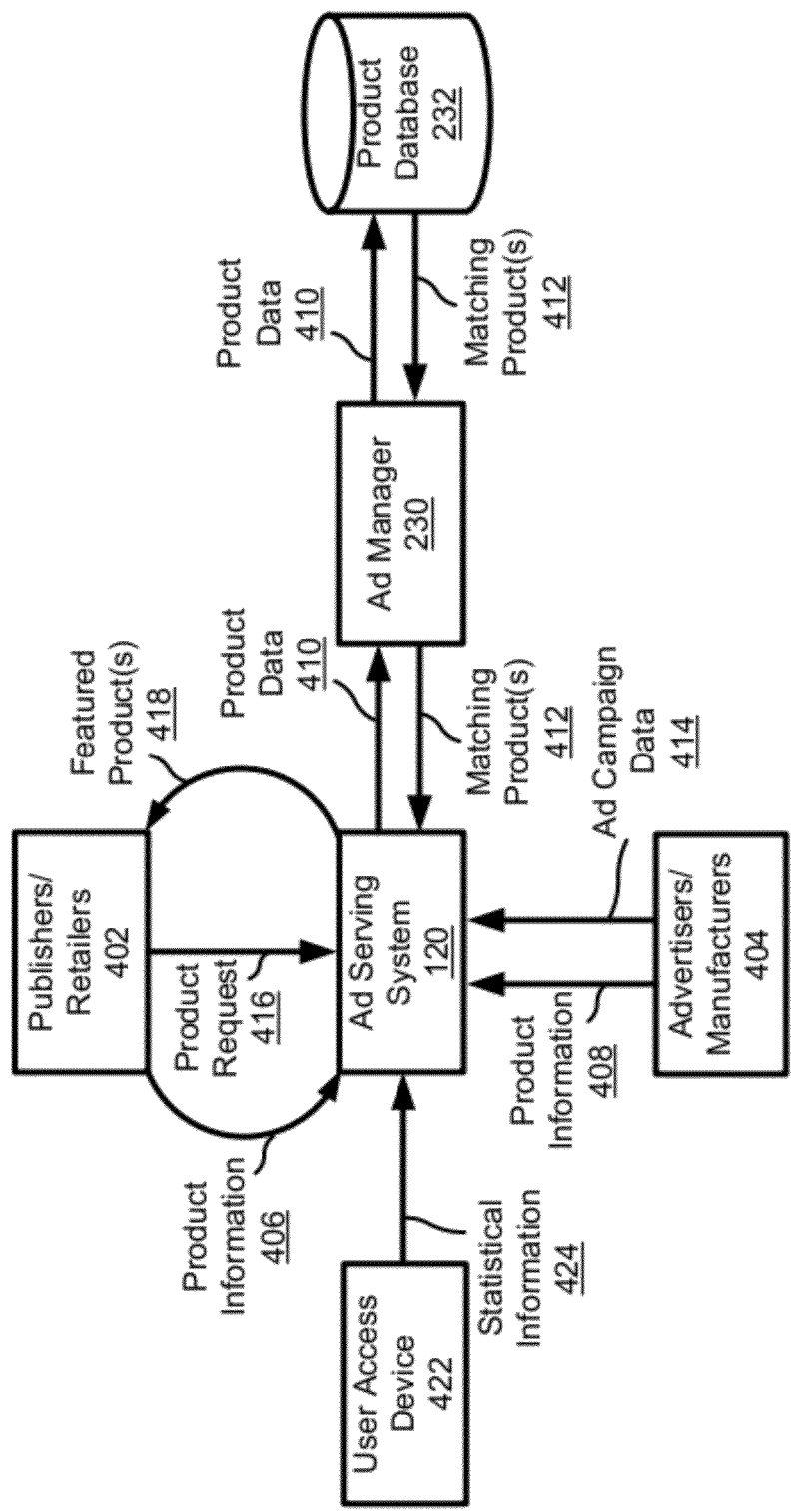
FIG. 4 is an example of a flow diagram showing the presentation of featured products based on product information supplied by advertisers such as manufacturers and publishers such as retailers.

FIG. 3 is an example of a process 300 for facilitating the identification and presentation of featured products based on product information supplied by advertisers such as manufacturers and publishers such as retailers (e.g., Example_Pet_Supply_Retailer), and FIG. 4 is a an example of a flow diagram showing the presentation of featured products based on such product information. For the sake of simplicity and brevity, FIG. 3 will now be described in conjunction with FIG. 4. Also, the process 300 can be performed, for example, by the ad manager 230, and for clarity of presentation, the description that follows uses the ad manager 230 as the basis of examples for describing the process 300. However, another system or combination of devices and systems also can be used to perform the process 300.

Referring to FIG. 3, at 302, attribute data from a first entity (e.g., a retailer) relating to advertisement presentations on a content page of the first entity can be received. For example, a retailer 402 (or other similar publisher) can supply product information 402 to the ad serving system 120. In some implementations, the product information 406 supplied by the retailer 402 can include information pertaining to products (or services) the retailer offers (e.g., kitchen appliance, cameras, mobile phones, etc.). For example, the product information 406 can include product attribute information such as, without limitation, product name (e.g., the product's name or title appeared on the retailer's product page), product description (e.g., as appeared on the product page), product price, and product image URL. Optionally, business information such as the category of business in which the retailer is engaged (e.g., department store, boutique, kiosk, etc.) also can be provided to the ad serving system 120.

Figure 5A:
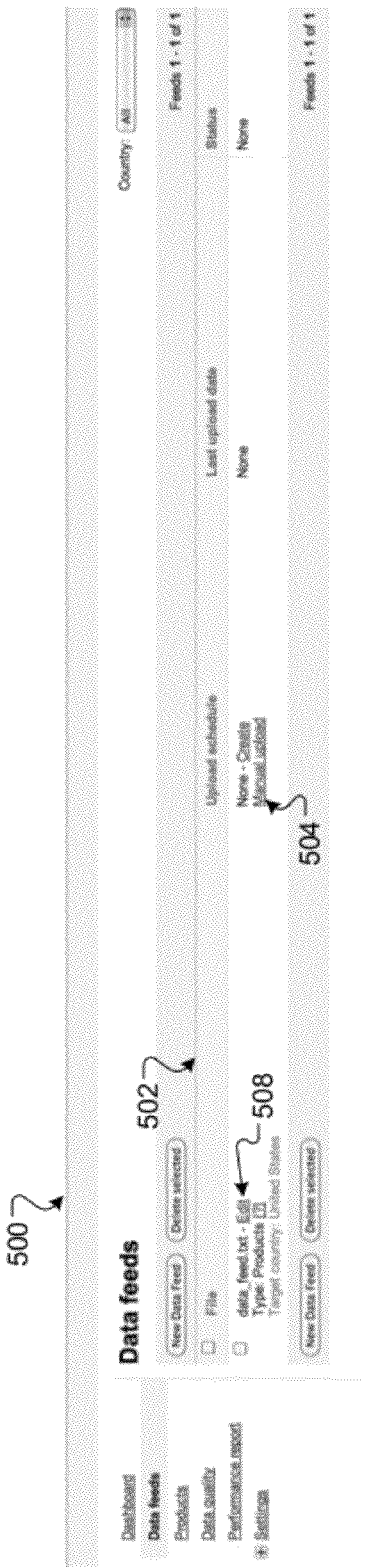
FIG. 5A shows an example of a data feed user interface through which product information provided by retailers can be transmitted to an ad serving system.

The product information 406 supplied by the retailer 402 can be any structured data file or stream. The retailer can provide, for example, a text file with an associated schema describing the feed semantics. In some implementations, the retailer 402 can supply the product information 406 by manually identifying or uploading a list of products maintained or sold by the retailer (e.g., by uploading a text file to a data feed interface used to allow the retailer 402 to add, edit, or delete information about its business and physical location(s)). FIG. 5A shows an example of a data feed user interface 500 through which the product information 406 can be transmitted to the ad serving system 120.

Figure 5B:
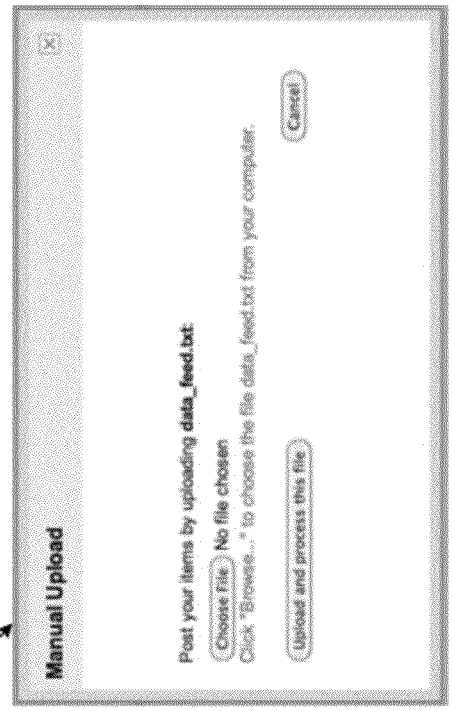
FIG. 5B shows an example of an upload user interface from which product information can be uploaded to an ad serving system in the form of a text file.

As shown in FIG. 5A the data feed user interface 500 displays a new product feed 502. The retailer 402 can use the data feed user interface 500 (or other similar user interfaces) to enter new or modify existing attribute data. To access the data feed user interface 500, the retailer 402 can sign in (e.g., create or use an existing account to log into the ad serving system 120), create a merchant account to upload the product information 406, specify product feed settings (e.g., filename and other parameters), create and upload the product information 406, and check the product information 406 for errors (e.g., formatting errors). The product file containing the product information 406 can be in the form of a simple text file listing one or more products and related product data. For example, after creating the new product feed 502, a product feed data file can be manually uploaded by the retailer 402 to the ad serving system 120 by selecting the "manual upload" link 504. When the "manual upload" link 504 is selected, an upload user interface can be populated to allow a text file (or files in other format) containing the product information 406 to be uploaded. FIG. 5B shows an example of an upload user interface 510 from which the product information 406 can be uploaded to the ad serving system 120 in the form of a text file. As an alternative to file transmission, products and related product data can also be manually entered (or edited) by selecting the "Edit" link 508.

In some implementations, the product information 406 can contain attributes of the products that can be compiled into, for example, a product catalog by the ad serving system 102 and the ad manager 230 that maps the product information 406 to common semantics. The common semantics in the product catalog can define all attributes serving as ad serving criteria to which product information 408 provided by a manufacturer 404 can be matched, as will be discussed in greater detail below.

Referring back to FIG. 3, at 304, campaign information associated with an ad campaign from a second entity (e.g., a manufacturer) can be received. For example, the manufacturer 404 can supply ad campaign data 414 to the ad serving system 120. The ad campaign data 414 can define one or more ad campaigns, and include a start date, an end date, budget information, geo-targeting information, syndication information, and similar campaign data. For example, a camera manufacturer can create an advertising campaign for cameras, and a separate advertising campaign for tripods. The campaign for the cameras can define one or more product ad groups (e.g., each ad group associated with a particular camera model), each containing one or more ads or creatives. Each ad group can include targeting information (e.g., a set of keywords, a set of one or more topics, geo-location information, user profile information, user device characteristics, etc.), and price or offer information (e.g., maximum cost or cost per selection, maximum cost or cost per conversion, etc.)).

Alternatively or in addition, each product ad group can include an average cost (e.g., average cost per selection, average cost per conversion, etc.). Therefore, a single maximum cost and/or a single average cost can be associated with one or more keywords, and/or topics. As stated, each product ad group can have one or more ads or creatives (e.g., ad content that is ultimately rendered to the user access device 422). Unlike conventional product ads where an end user may be directed to an advertising page of the advertiser sponsoring the product ad, each product ad or creative can be restricted to a content page (or other pages within the retail web site) specified by the retailer 402 so that products matching both the product information 406 and the product information 408 may only be displayed when a user is in a retailer's subdirectory that carries the advertised merchandise, as will be discussed in greater detail below.

Figure 6:
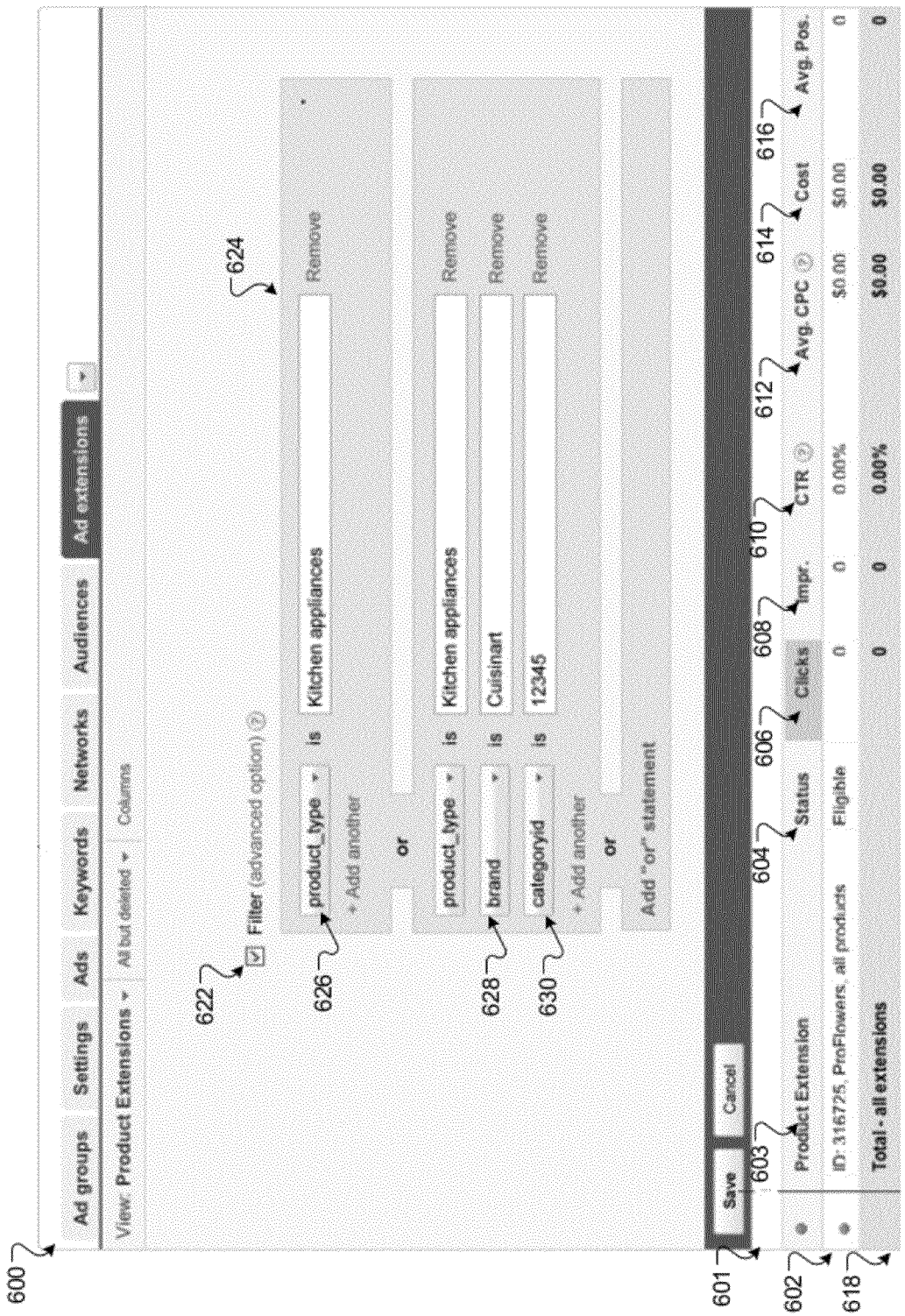
FIG. 6 shows an example of an ad campaign user interface configured to display information associated with an ad campaign comprising one or more product ad groups.

FIG. 6 shows an example of an ad campaign user interface 600 configured to display information associated with an ad campaign comprising one or more product ad groups. The ad campaign can be an actual campaign in which one or more ads are presented to public users. For example, an ad associated with the actual ad campaign can be displayed in conjunction with search results presented in response to a search request. An ad also can be displayed along with other content on a third-party web page.

As shown, the ad campaign user interface 600 can display an ad campaign listing 602 that identifies the ad campaign and a campaign status identifier 604 that indicates the current status of that ad campaign. For example, the campaign status identifier 604 indicates that the "ProFlowers" ad group is currently "Eligible", where upon activation, an ad corresponding to the "ProFlowers" ad can be displayed, and a cost to the ad sponsoring the "ProFlowers" ad group can be incurred.

The ad campaign user interface 600 can also display an ad group summary section 601, and the ad group summary section 601 can include a product extension column 603 for identifying each product ad group. Further, the information associated with a product ad group can be presented as a single row in the ad group summary section 601. For example, information associated with the "ProFlowers" ad group can be presented in a first row and any subsequent product ad group can be presented in a second row immediately below the first row. Additionally, the bottom row 618 can be used to present a column total or column average for all of the product ad groups included in the ad group summary section 601.

The ad group summary section 601 can also include a status column 604, a clicks column 606, an impressions column 608, a CTR column 610, an average CPC column 612, a cost column 614 and an average position column 616. The campaign status column 604 can be included in the product ad group summary section 601 to indicate the status of each product ad group, such as "Active", "Eligible" or "Deleted". For example, the status of an ad campaign can be "Active" if the ad campaign is presently running, "Eligible" if the campaign has been reviewed, approved and is eligible to run and be activated, and "Deleted" if the campaign has been disabled. The campaign status column 604 can also be configured to include one or more selectable controls to permit a user, such as an advertiser, to change the campaign status.

The ad group summary section 120 can also be configured to present information relating to the performance of a product ad group. The clicks column 606 can indicate the number of clicks that have been generated by the product ad group for a given time period. Further, the impressions column 608 can provide the number of ad impressions for a product ad group over the same period. Additionally, the number of clicks can be divided by the number of impressions to determine the CTR, which can be presented in the CTR column 610.

As the bid for an ad group can vary with each impression, an average cost for the ad group over a specific time period can be displayed in the average CPC column 612. The cost column 614 also can be provided to indicate the total cost of the product ad group over the same period. Additionally, the average position column 616 can be included to identify the average display position of the impressions associated with the product ad group. By specifying two or more different time periods, a user can analyze the performance of a product ad group over the specified periods. Further, a user can also compare the performance of two or more product ad groups over a specific time span. If desired, one or more ad group parameters can be modified to influence future ad group performance.

As discussed above, the retailer 402 can provide campaign information associated with an ad campaign to the ad serving system 120. In some implementations, the campaign information can also include product information associated with one or more promotional products. For example, in targeting products for displaying on the content page of the retailer 402, in addition to the data specified in the ad group summary section 601, the manufacturer 404 can also supply product information 408 associated with one or more promotional products to the ad serving system 120 by selecting the "filter" option 622. Similar to the production information 406, the product information 408 can contain product attribute information such as, without limitation, product name (e.g., the product's name or title appeared on the retailer's product page), product description (e.g., as appeared on the product page), product price, and product image URL. Additionally, the product information 408 can include brand identification, categorization, discount information, rebate information, purchasing rules, and purchase limit. Such attributes can include images, graphics, textual data, or a combination thereof relating to one or more products of interest (e.g., products that the manufacturer 404 would like to promote on the content page of the retailer 402). For example, the product information 408 can include information relating to a new product, a current or future sales program, a current or future sales period, a discount or rebate information for currently displayed or stocked products or future products and similar commercial or promotional information.

In some implementations, the manufacturer 404 can also submit a feed of data containing strong identifiers for all of the products manufactured by the manufacturer. One strong identifier can include the Universal Product Code (UPC) symbol or indicia. A UPC symbol or indicia is generally affixed to a product (or other articles of commerce), and contains two parts: a first part with a pre-assigned number identifying a particular manufacturer and a second part with information identifying a particular type of the manufacturer's products.

The manufacturer 404 can also submit other types of identifiers such as, without limitation, International Standard Book Numbers (ISBNs), International Standard Serial Numbers (ISSNs), Global Service Relation Numbers (GSRNs), European Article Numbers (EANs), Global Trade Identification Numbers (GTINs), Stock Keeping Units (SKUs), Manufacture Part Numbers (MPNs), and other similar uniform product codes. Any of the foregoing identifiers can be used to uniquely identify an individual product with which the attribute date from the retailer can be compared to determine a matching product, as will b discussed in greater detail below.

In some implementations, the ad serving system 102 can infer additional information about one or more products included in the product information 408 based on data from other third party sources to create an enriched product catalog. Such additional information can include, without limitation, user rating, product reviews and similar featured information. The ad serving system 102 and the ad manager 230 can query other retailers and manufacturers for additional attributes of a product that needs to be enriched with additional information, or search in another retailer's product feed for additional product attributes for specified products.

Once the "filter" option 622 is selected, a product feed section 624 can be presented. The product feed section 624 can facilitate the creation of product attributes to be used in restricting the types of products that the manufacturer 404 would like to promote on the content page of the retailer 402. For example, the manufacturer 404 can specify a product type under the product type field 626 to restrict the bidding to only those products specified by the manufacturer 404. In the example shown, the manufacturer 404 can specify a bid on promoting kitchen appliances on the content page of the retailer "Proflowers". If desired, the "filter" option 622 can function as an exclusive (e.g., as opposed to inclusive) filter to allow the manufacturer 404 to exclude any of the products presented from product targeting so that any product not selected will be considered as products to be promoted.

In addition to the product type field 626, the manufacturer 404 can further select additional fields such as a brand field 628 and a category identification field 630, and specify additional attributes to further narrow the bidding to a specific type of product(s). For example, the manufacturer 404 can specify a product or a group of products carrying the category identification number "12345" (or other product identifiers such as SKU number and UPC code) and brand "Cuisinart". While not shown, other attributes such as product model designation, product design such as product size, shape and color, product feature, product function, product price, or other similar product features can also be used for filtering unwanted products so that only a selected product is or groups of products are used for identifying the matching product 412 to be promoted on the retailer's web site.

In some implementations, the ad serving system 120 can also provide, for example, a product rating as one attribute for each of the products provided by the retailer 402 and the manufacturer 404 to aid both parties in the identification of products for which product targeting is allowed. For example, the ad serving system 120 can assign a product rating to each product, for example, based on products in a similar category, product ratings assigned by users, or based on statistical information associated with the products (e.g., as received from other retailers or manufacturers).

In sum, the attribute data specified in the product feed section 624 allows the manufacturers 404 to promote particular products only in connection with those customers who wish to view products in the same product category. For example, assuming a mobile phone manufacturer wishes to display particular phones in ads when users have selected the mobile phone category for browsing, products matching the product information 406 provided by the retailer 402 and the production information 408 provided by the manufacturer 404 (e.g., matching products 412) are then displayed in a specific category or subcategory page. The matching products 412 can be displayed as search results in a retailer's subdirectory or search results page from which the user can be directed to a corresponding product page that is hosted by the retailer to purchase the selected product or receive product data relating to the selected product. This provides the retailer with assurances that consumers will not be diverted from the retailer's web site, but also provides the advertiser with assurances that a tailored and directed advertisement in the form of a promoted product can be delivered to a user (instead of a product description that the retailer may otherwise define without regard to the advertiser's preferences).

Referring back to FIG. 3, at 306, at least one matching product from the one or more promotional products can be identified based on the attribute data provided by the retailer 402 and the product information provided by the manufacturer 404. As discussed above, the manufacturer 404 can define a unique line of products (e.g., via the product information 408). Based on both the production information 406 supplied by the retailer 402 and the production information 408 supplied by the manufacturer 404, the ad serving system 102 and the ad manager 230 can identify specific products (or services), or product (or service) categories that can be shown, or be excluded from being shown, as ads on a content page of the retailer 402 (e.g., home page, search result page, product page or other similar retail/listing page of the retailer 402).

For example, the ad serving system 120 can relate both the production information 406 supplied by the retailer 402 and the production information 408 supplied by the manufacturer 404 as product data 410 to the ad manager 230. In response, the ad manager 230 can query the product database 232 to determine one or more product(s) being promoted by the manufacturer 404 that do not meet the product criteria set forth by the retailer 402. For example, unwanted products can be removed by comparing the product information 408 supplied by the manufacturer 404 against the product information 406 supplied by the retailer 402. If at least one product provided by the manufacturer 404 matches the product information 406 supplied by the retailer 402, the matching product 412 can be relayed back to the ad manager 230. As an example, if the retailer 402 specifies in the product information 406 that digital cameras are being sold and the product promoted by the manufacturer Nikon® is the newest model of the digital camera product line, then the product database 232 can find that a match has been found, and identify the matching product (e.g., the newest digital camera model promoted by the manufacturer Nikon®) to the ad manager 230 and the ad serving system 120.

Where multiple matching products 412 are found, the matching products 412 can be ranked in order of the quality of the match. In some implementations, the quality of the match can be used as part of a function to determine which product is to be returned upon receiving a product request 416. Specifically, the quality of the match can consider the likelihood that a user will select a particular product in a given purchase. For example, where the product information 406 supplied by the retailer 402 specifies camera products and accessories carrying the Nikon® brand as serving criteria, and two products promoted by the manufacturer 404 are a particular Nikon® digital camera and a particular Nikon® industrial microscope, the Nikon® camera can be ranked higher than the Nikon® industrial microscope because consumers are likely to search for or purchase digital cameras than industrial microscopes. Other conventional types of ranking are also possible such as, without limitation, ranking by organic search quality features, ranking by features based on user behavior, and ranking of results taking into account various bids.

In some implementation, to facilitate the ranking of the matching products 412, additional information concerning, for example, the user access device 422 accessing the retailer's content page can also be collected and stored in the product database 232. Such additional information can include, without limitation, IP address, cookie information, languages, geographical information, historical browsing information relating to documents previously accessed by the user access device 422 (e.g., a URL of a web site accessed by the user access device 422). The matching products 412 can then be ranked based, at least in part, on these additional information (e.g., in addition to the quality of the matching products 412). The rank of a matching product can, in some cases, correspond to the probability that a user will select the matching product 412. Each matching product can then be displayed to the user access device 422 based on a respective rank. For example, higher ranking products can be positioned at more prominent or visually-recognized locations than lower ranking products. In some implementations, information indicating whether a particular product was selected or was not selected as well as which product performs best can be routed to the ad serving system 120 and the ad manager 230 to create an empirical model so as to improve product ranking.

Figure 7:
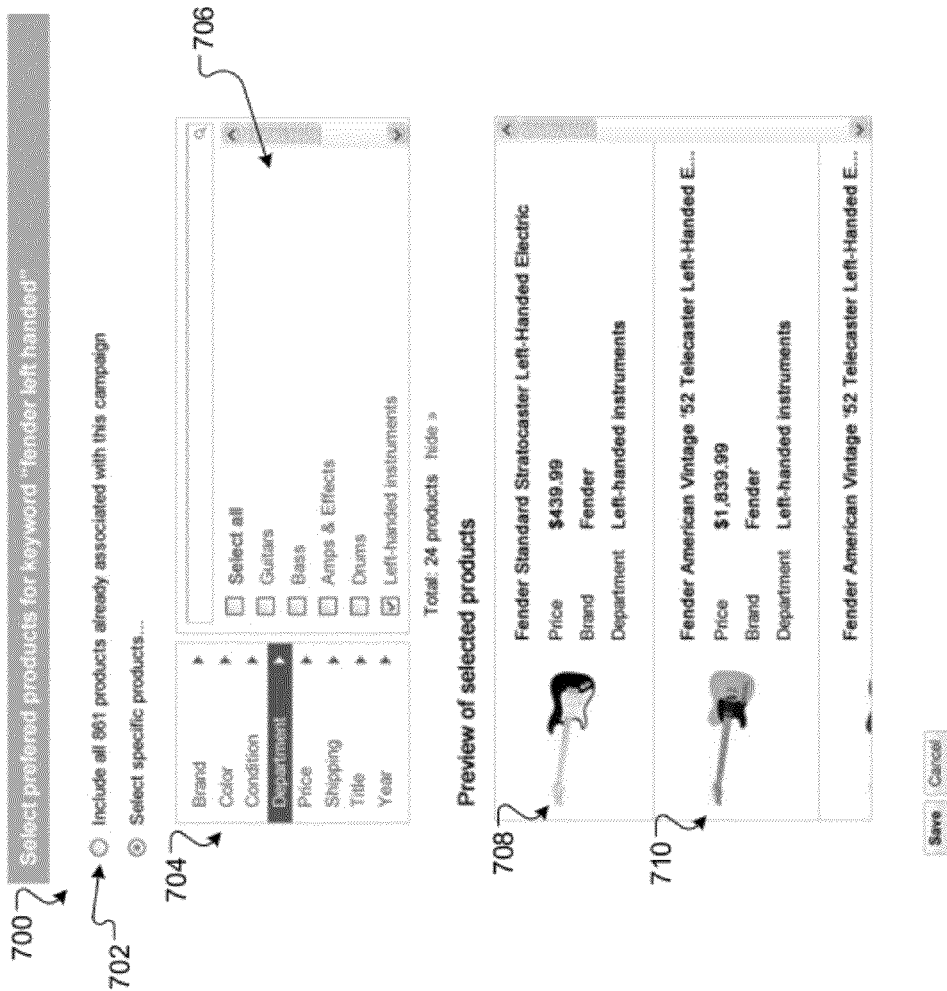
FIG. 7 shows an example of a discovery user interface to facilitate the process of selecting one or more retail products for which a manufacturer can potentially promote on a retailer's content page through bidding.

As discussed above, the product information 408 supplied by the manufacturer 404 can be compared against the product information 406 supplied by the retailer 402 to identify one or more matching products 412. In some implementations, the matching process can also be partially performed by the manufacturer 404. For example, in supplying the product information 408, a discovery user interface can be presented to the manufacturer 404 showing one or more products currently offered by the retailer 402 (e.g., products previously identified by the retailer 402 in the product information 402 and stored in the product database 232). From the discovery interface, the manufacturer 404 can directly select one or more retail products offered by the retailer 402 for bidding. FIG. 7 shows an example of such a discovery user interface 700 to facilitate the process of selecting one or more retail products for which the manufacturer 404 can potentially promote on the retailer's content page through bidding.

Referring to FIG. 7, the discovery user interface 700 can include one or more product categories 704 from which a specific product or groups of products can be specified for bidding. If desired, the manufacturer 404 can also bid on all available products associated with the ad campaign via button 702 in lieu of a specific product or groups of products. As shown, the discovery user interface 700 allows the manufacturer 404 to search for and select one or more retail products for bidding. For example, the manufacturer 404 can navigate through the product categories 704 (e.g., brand, color, condition, department, price, shipping, title and year) to locate the product(s) of interest. In some implementations, each category 704 can include one or more subcategories 706 for refining the product selection, and all of the retail products available through the categories 704 and subcategories 706 can be those offered by the retailer 402.

In selecting a specific product or groups of products through the discovery user interface 700, the manufacturer 404 is, in effect, performing an identification process by which one or more retail products offered by the retailer 402 are identified and selected by the manufacturer 404 for bidding. For example, the manufacturer 404 can select all Fender® products falling under the subcategory "Left-handed instruments" such as "Fender Standard Stratocaster Left-Handed Electric Guitar" 708 and "Fender American Vintage '52 Telecaster Left-Handed Electric Guitar" 710 offered by the retailer 402 for bidding.

Referring back to FIG. 3, at 308, the presentation of an ad for the matching product on the content page can be provided, where the ad can include a link to a product page that promotes an offering of the matching product by the first entity (e.g., in response to the product request 416). The product request 416 can refer to a request for matching product that can be displayed on the content page of the retailer 402. In some implementations, the product request 416 can be sent by a browser, on behalf of a user, to the ad serving system 120 using, for example, the Internet. Upon receiving the product request 416, the ad serving system 120 can select one of the matching products 412 as a featured product 418, and relay the featured product 418 to the retailer 402 for display.

In some implementations, the featured product 418 can be associated with one or more related keywords. These keywords can be derived from the names and/or description of the product and/or product categories as contained in the product information 408. In some implementations, the keywords can also be provided by the manufacturer 404 when submitting the ad campaign data 414 such that the featured product 418 can be located by a user through submitting the same keywords to the ad serving system 120. In some implementations, other types of associations can also be used, such as product categorization. In general, the product association can depend on relevancy measures, such as targeted keywords, product descriptions, customer or user profile information.

In some implementations, the ad serving system 120 can be configured to permit multiple manufacturers 404 to compete for the same advertising space on the retailer's result page. For example, if two or more manufacturers 404 desire to have their respective matching products displayed in response to a specific keyword or keyword combination, each manufacturer 404 can specify a bid corresponding to their matching product. The ad serving system 120 can then conduct an auction, and select the matching product 412 with the highest bid for display in response to the search query.

As discussed previously, the ad serving system 120 can be configured to determine the ranking order of the featured product 418 in accordance with one or more factors (e.g., which can also include the corresponding bids). In some implementations, the product database 232 can include quality data to aid the ad serving system 120 in determining the ranking of the products. Such quality data can include, without limitation, a total number of impressions associated with each featured product 418, or an impression rate for each featured product 418, and/or other quality parameter and/or impression parameters. Example impression rates can include a percentage of total potential viewers (e.g., the number of identified impressions divided by the number of viewers), and a percentage of actual impressions of a total number of impressions (e.g., a percentage of reliable impressions divided by a total number of impressions).

Other performance data can also be stored in the product database 232 in aiding the ad serving system 120 to determine suitable featured product 418 (e.g., performance of a particular featured product 418, the probability that viewers will select other non-featured products, and the probability that viewers will navigate to other content pages after seeing the featured product 418).

In some implementations, the featured product 418 can be returned in the form of a creative that includes text, graphics and/or video clips. In some implementations, the featured product 418 displayed on the retailer's result page can include product data associated with the featured product 418. When the featured product 418 is displayed, a determination can be performed to determine whether there is any existing product data such as user rating or pricing information associated with the featured product 418 that may be relevant to the search query. If so, the initial display of the creative can include one or more lines for displaying such data.

Figure 8:
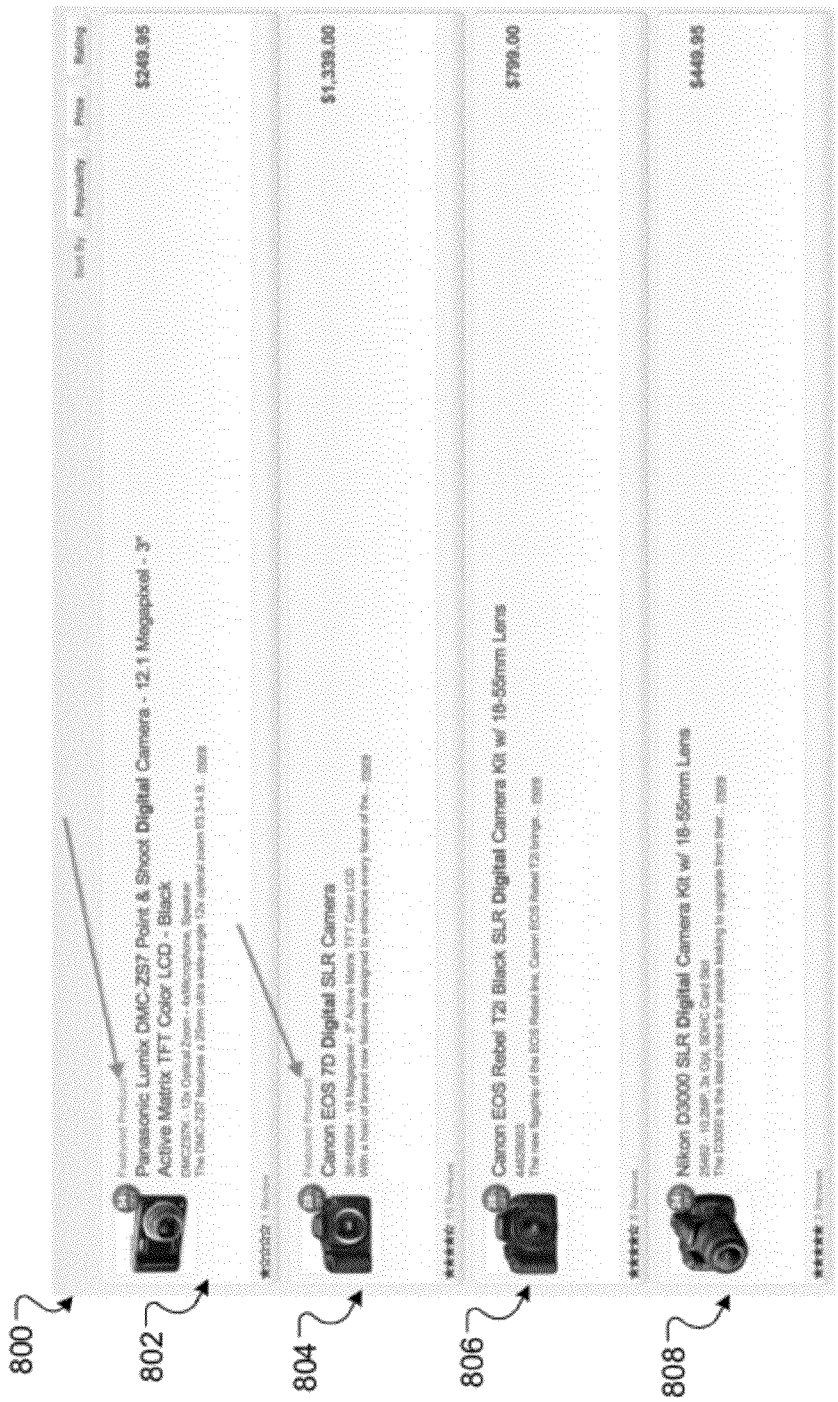
FIG. 8 shows an example of a content page displaying two featured products sponsored by a manufacturer that are identified based on product information provided by a retailer and the manufacturer.

FIG. 8 shows an example of a content page 800 displaying two featured products sponsored by the manufacturer 404 that are identified based on product information provided by the retailer 402 and the manufacturer 404. As shown, the content page 800 can present a featured product 802 in the form of a creative to the end user along with non-sponsored search results 806 and 808. The creative, in this example, is indicated under the "Featured Product" section. If sufficient advertising space is available, any additional matching product can also be shown on the content page 800 as an additional featured product. For example, the featured product 802 featuring a Panasonic® Lumix digital camera and the featured product 804 featuring a Canon® EOS digital camera both can be presented on the content page 800.

In some implementations, the ad serving system 120 can combine the featured product 802 and other related product data as a single creative. The combination can be performed prior to delivery of the featured product 802 to the user or contemporaneously when the ad serving system 120 serves the featured product 418 to the end user.

In some implementations, the featured product 418 can link to a product page of the retailer in a manner similar to other non-sponsored, organic search results. For example, when the end user clicks on one of the featured products 802 and 804, the end user can be redirected to the product page of the respective featured products 802 and 804. Allowing the end user to be directed to the product page upon selecting the featured product 802 ensures that user traffic is not diverted to elsewhere (e.g., to other third party web sites, such as the advertiser's web site), while still allowing the advertiser to tailor its message for a featured product shown when a related search query is made.

Figure 9:
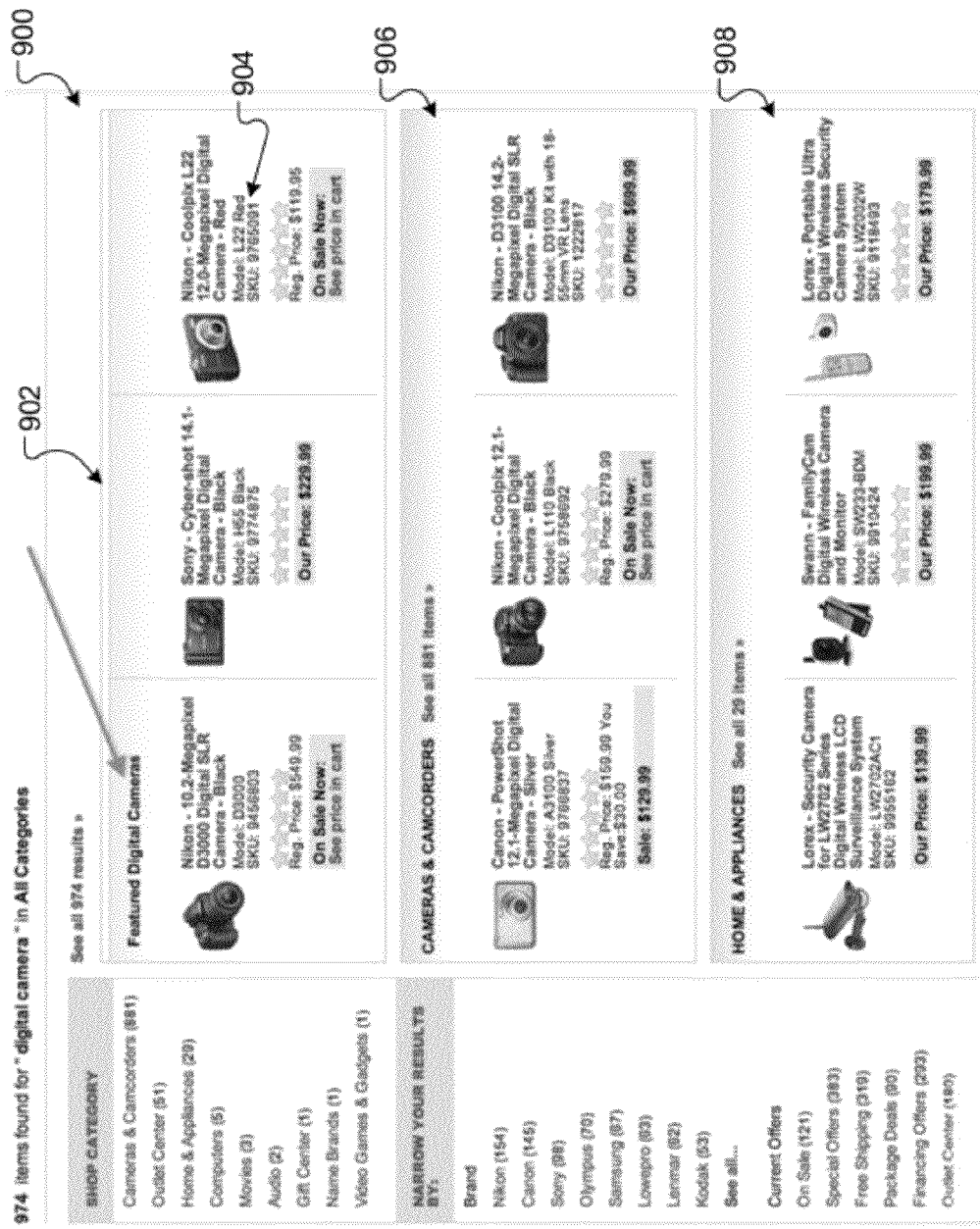
FIG. 9 shows another example of a content page displaying a plurality of featured products sponsored by various manufacturers.

FIG. 9 shows another example of a content page 900 displaying a plurality of featured products sponsored by various manufacturers. As shown, a series of featured products 902 sponsored by various manufacturers can be served on the content page 900. The featured products 902 can be rendered in a similar way to the normal search results 906 and 908 located by the retailer's internal search engine. As discussed above, the manufacturer 404 can submit a feed of data containing strong identifiers such as SKU numbers and UPC codes to the ad serving system 120. These identifiers can be used to locate the featured products 902 (e.g., by matching the identifiers to identifiers of those products offered by the retailer 402). The featured product 902 along with its associated identifier and product data such as model designation, user feedback and pricing information can all be shown to the user to improve the quality of the overall product targeting.

In sum, the foregoing product targeting approach allows the manufacturer 404 to create targeted marketing campaigns for one or more featured products 418. These campaigns can be used tactically to promote new product lines or promote a new product during, for example, a high spending season (e.g., during the holidays), while giving the manufacturer 404 an opportunity to pay for ads that have a clear and immediate payoff as featured products are purchased from the retailer 402 offering the same products. Further, because the manufacturer 404 can define the type of product information that can be included in the product creative, the manufacturer 404 is also given flexible control over the branding of the products on the retailer's content page via the ability to add promotional messages to the creative.

The retailer 402 can also benefit from the foregoing product targeting approach by publishing quality/relevant products on the content page that would otherwise be shown for free while establishing an additional revenue stream from monetizing the ad space. Further, because the targeted product creative directly promotes and features a product readily offered by the retailer 402, click-through and conversion rates can potentially be increased.

Example Computer System

Figure 10:
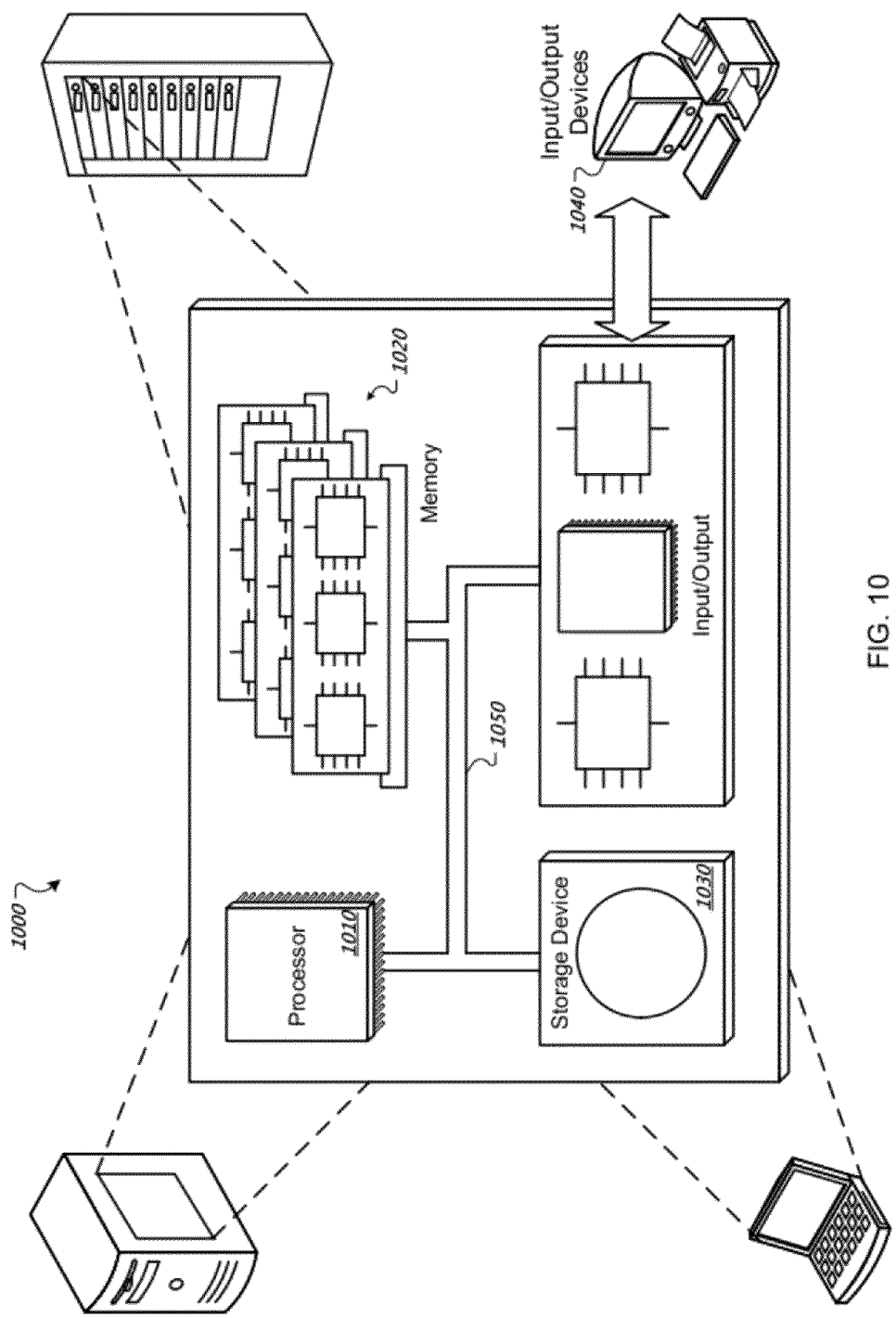
FIG. 10 is a block diagram of a processing device that may be used to execute methods and processes disclosed herein.

FIG. 10 is a block diagram of generic processing device that may be used to execute methods and processes disclosed. The system 1000 may be used for the operations described in association with the method 300 according to one implementation. The system 1000 may also be used for the operations described in association with the method 1000 according to another implementation. For example, the system 1000 may be included in either or all of the CMS 106, the publishers 104, and the advertisers 102.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. In some implementations, the memory 1020 is a volatile memory unit. In other implementations, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The storage device 1030 may be used, for example, to store information in the content repository 124, and the ad repository 126.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The features described may be implemented in digital electronic circuitry, or in computer hardware, firmware, software, or in combinations of them. In some implementations, the apparatus may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output. In other implementations, the apparatus may be implemented in a computer program product tangibly embodied in an information carrier for execution by a programmable processor. In some implementations, the information carrier can include a propagated signal.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

A number of embodiments of the invention have been described. Nevertheless, it will be understood that various modifications may be made without departing from the spirit and scope of the invention. Accordingly, other embodiments are within the scope of the following claims.

What is claimed is:

1. A method implemented in a data processing apparatus, comprising:
   receiving, at an advertising serving system, attribute data from a retailer system of a retailer offering promotional products, the attribute data for advertisement presentations on a content page of a web site of the retailer, the attribute data describing attributes of one or more promotional products being products offered by the retailer;
   receiving, at the advertising serving system, campaign information associated with an advertising campaign from a manufacturer system of a manufacturer of the promotional products, the campaign information including product information describing attributes of products manufactured by the manufacturer, including attributes of the one or more promotional products, and advertising targeting criteria;
   receiving, at the advertising serving system and from a user device, a request for an advertisement for an advertisement presentation on the content page;
   comparing, at the advertising serving system and in response to the request, the attributes of one or more promotional products being products offered by the retailer to the attributes of products manufactured by the manufacturer and identifying, based on the comparison, from the one or more promotional products, matching products offered by the retailer and manufactured by the manufacturer of the promotional products;
   selecting, by the advertisement serving system, one of the matching products as a selected product based on the request for the advertisement meeting advertising targeting criteria associated with the selected product; and providing, from the advertisement serving system and for presentation on the content page on the web site of the retailer, an advertisement for the selected product, the advertisement including a link to a second content page on the web site of the retailer, the second content page promoting an offering of the selected product by the retailer.

2. The method of claim 1, wherein receiving the campaign information includes receiving identification information unique to the one or more promotional products, each promotional product having a different identifier for identifying the promotional product.

3. The method of claim 1, wherein identifying matching products includes identifying, among the one or more promotional products, a product offered by the retailer and for which at least one attribute matches an attribute of a products manufactured by the manufacturer.

4. The method of claim 1, wherein receiving the campaign information includes receiving one or more creatives associated with the one or more promotional products from the manufacturer, each of the one or more creatives including identification information identifying a respective individual promotional product.

5. The method of claim 4, wherein providing, from the advertisement serving system and for presentation on the content page on the web site of the retailer, an advertisement for the selected product comprises providing the creative associated with the selected product.

6. The method of claim 1, wherein:
receiving the attribute data includes receiving a listing of products including the one or more promotional products; and
receiving the campaign information includes receiving a selection of one or more targeted products from the listing of products.

7. The method of claim 6, wherein identifying the matching products includes identifying a selected one or more targeted products as matching products.

8. The method of claim 6, wherein:
receiving the listing of products includes receiving product information identifying one or more categories and subcategories with which the one or more promotional products are associated; and
receiving the selection includes receiving the selection of the one or more targeted products through the one or more categories and sub-categories.

9. The method of claim 6, wherein:
receiving the listing of products includes receiving one or more retailer offers on one or more retailer products including the one or more promotional products; and
receiving the campaign information includes receiving product targeting information for targeting the one or more retailer offers on the one or more retailer products.

10. A method implemented in a data processing apparatus, comprising:
receiving, at an advertising serving system and from a retailer system, a listing of a plurality of products offered by a retailer;
receiving, at the advertising serving system and from the retailer system, serving criteria for serving advertisements for each of the plurality of products;
receiving, from an advertiser that is separate from the advertising serving system and the retailer system, selections selecting products from the plurality of products for which targeting according to the serving criteria is desired;
receiving, at the advertising serving system, a product request for a matching product to be displayed on the content page of the retailer;
identifying, at the advertising serving system, a matching product that matches the product request based on the selections and the serving criteria; and
providing, from the advertising serving system, in response to the product request, an advertisement for the matching product that is to be presented on a first content page of hosted by the retailer system and that includes a link to a second content page hosted by the retailer system, the second content page promoting an offering of the matching product offered by the retailer.

11. A non-transitory computer-readable medium having instructions stored thereon, which, when executed by a processor at an advertising serving system, causes the processor to perform operations comprising:
receiving, at the advertising serving system, attribute data from a retailer system of a retailer offing promotional products, the attribute data for advertisement presentations on a content page of a web site of the retailer, the attribute data describing attributes of one or more promotional products being products offered by the retailer;
receiving, at the advertising serving system, campaign information associated with an advertising campaign from a manufacturer system of a manufacturer of the promotional products, the campaign information including product information describing attributes of products manufactured by the manufacturer, including attributes of the one or more promotional products, and advertising targeting criteria;
receiving, at the advertising serving system and from a user device, a request for an advertisement for an advertisement presentation on the content page;
comparing, at the advertising serving system and in response to the request, the attributes of one or more promotional products being products offered by the retailer to the attributes of products manufactured by the manufacturer and identifying, based on the comparison, from the one or more promotional products, matching products offered by the retailer and manufactured by the manufacturer of the promotional products; and
providing, from the advertisement serving system and for presentation on the content page of the web site of the retailer, an advertisement for the selected product on the content page, the advertisement including a link to a second content page on the web site of the retailer, the second content page promoting an offering of the selected product by the retailer.

12. The computer-readable medium of claim 11, wherein receiving the campaign information includes receiving identification information unique to the one or more promotional products, each promotional product having a different identifier for identifying the promotional product.

13. The computer-readable medium of claim 11, wherein identifying matching products includes identifying, among the one or more promotional products, a product offered by the retailer and for which at least one attribute matches an attribute of a products manufactured by the manufacturer.

14. The computer-readable medium of claim 11, wherein receiving the campaign information includes receiving one or more creatives associated with the one or more promotional products from the manufacturer, each of the one or more creatives including identification information identifying a respective individual promotional product.

15. The computer-readable medium of claim 14, wherein providing, from the advertisement serving system and for presentation on the content page on the web site of the retailer, an advertisement for the selected product comprises providing the creative associated with the selected product.

16. The computer-readable medium of claim 11, wherein:
receiving the attribute data includes receiving a listing of products including the one or more promotional products; and
receiving the campaign information includes receiving a selection of one or more targeted products from the listing of products.

17. The computer-readable medium of claim 16, wherein identifying the matching product includes identifying a selected one or more targeted products as matching products.

18. The computer-readable medium of claim 16, wherein:
receiving the listing of products includes receiving product information identifying one or more categories and sub-categories with which the one or more promotional products are associated; and
receiving the selection includes receiving the selection of the one or more targeted products through the one or more categories and sub-categories.

19. The computer-readable medium of claim 16, wherein:
receiving the listing of products includes receiving one or more retailer offers on one or more retailer products including the one or more promotional products; and
receiving the campaign information includes receiving product targeting information for targeting the one or more retailer offers on the one or more retailer products.

20. An advertising serving system, comprising:
a data processing apparatus; and
a memory system storing instructions executable by the data processing apparatus and that upon such execution cause the data processing apparatus to perform operations comprising:
receiving, at the advertising serving system, attribute data from a retailer system of a retailer offering promotional products, the attribute data for advertisement presentations on a content page of a web site of the retailer, the attribute data describing attributes of one or more promotional products being products offered by the retailer;
receiving, at the advertising serving system, campaign information associated with an advertising campaign from a manufacturer system of a manufacturer of the promotional products, the campaign information including product information describing attributes of products manufactured by the manufacturer, including attributes of the one or more promotional products, and advertising targeting criteria;
receiving, at the advertising serving system and from a user device, a request for an advertisement for an advertisement presentation on the content page;
comparing, at the advertising serving system and in response to the request, the attributes of one or more promotional products being products offered by the retailer to the attributes of products manufactured by the manufacturer and identifying, based on the comparison, from the one or more promotional products, matching products offered by the retailer and manufactured by the manufacturer of the promotional products;
selecting, by the advertisement serving system, one of the matching products as a selected product based on the request for the advertisement meeting advertising targeting criteria associated with the selected product; and
providing, from the advertisement serving system and for presentation on the content page on the web site of the retailer, an advertisement for the selected product, the advertisement including a link to a second content page on the web site of the retailer, the second content page promoting an offering of the selected product by the retailer.

* * * * *